US010831402B2

(12) United States Patent
Gong et al.

(10) Patent No.: US 10,831,402 B2
(45) Date of Patent: Nov. 10, 2020

(54) METHOD AND APPARATUS FOR ENSURING DATA CONSISTENCY

(71) Applicant: EMC IP Holding Company LLC, Hopkinton, MA (US)

(72) Inventors: Shaoqin Gong, Beijing (CN); Jian Gao, Beijing (CN); Geng Han, Beijing (CN); Hongpo Gao, Beijing (CN); Ree Lei Sun, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/454,868

(22) Filed: Jun. 27, 2019

(65) Prior Publication Data

US 2019/0317692 A1  Oct. 17, 2019

Related U.S. Application Data

(63) Continuation of application No. 15/848,642, filed on Dec. 20, 2017, now Pat. No. 10,365,856.

(30) Foreign Application Priority Data

Dec. 21, 2016 (CN) .......................... 2016 1 1192951

(51) Int. Cl.
*G06F 13/00* (2006.01)
*G06F 3/06* (2006.01)
*G06F 11/20* (2006.01)
*G06F 11/14* (2006.01)

(52) U.S. Cl.
CPC ............ *G06F 3/0656* (2013.01); *G06F 3/064* (2013.01); *G06F 3/065* (2013.01); *G06F 3/0614* (2013.01); *G06F 3/0619* (2013.01); *G06F 3/0689* (2013.01); *G06F 11/1438* (2013.01); *G06F 11/2056* (2013.01); *G06F 11/2064* (2013.01); *G06F 11/2082* (2013.01); *G06F 2003/0691* (2013.01)

(58) Field of Classification Search
None
See application file for complete search history.

(56) References Cited

U.S. PATENT DOCUMENTS

2011/0016338 A1* 1/2011 Williamson .......... G06F 9/3013 713/323
2012/0311261 A1* 12/2012 Mizuno ................ G06F 3/0665 711/118
2015/0277765 A1* 10/2015 Watanabe ............. G06F 3/0646 711/150
2017/0123722 A1* 5/2017 Sela ...................... G06F 3/0604
(Continued)

*Primary Examiner* — Sean D Rossiter
(74) *Attorney, Agent, or Firm* — BainwoodHuang

(57) ABSTRACT

Embodiments of the present disclosure provide methods and apparatuses for ensuring data consistency. In some embodiments, a method comprises writing data into a first temporary buffer in a first processor. The method further comprises, in response to the data being written into the first temporary buffer, sending the data to a second processor to update a copy of the data in the second processor. In addition, the method comprises, in response to receiving an indication that the second processor has received the data, copying the data from the first temporary buffer to a first working buffer in the first processor.

20 Claims, 6 Drawing Sheets

(56) References Cited

U.S. PATENT DOCUMENTS

| | | | |
|---|---|---|---|
| 2017/0177349 A1* | 6/2017 | Yount | G06F 15/8007 |
| 2017/0255662 A1* | 9/2017 | Scherrer | G06F 16/2282 |
| 2018/0137677 A1* | 5/2018 | Jeong | G06T 17/20 |
| 2018/0143781 A1* | 5/2018 | Greathouse | G06T 1/60 |
| 2018/0165217 A1* | 6/2018 | Greenspan | G06F 12/0897 |

* cited by examiner

METHOD AND APPARATUS FOR ENSURING DATA CONSISTENCY

RELATED APPLICATIONS

This application claims priority from Chinese Patent Application Number CN201611192951.9, filed on Dec. 21, 2016 at the State Intellectual Property Office, China, titled "METHOD AND APPARATUS FOR MAINTAINING DATA CONSISTENCY" and U.S. patent application Ser. No. 15/848,642, filed on Dec. 20, 2017, titled "METHOD AND APPARATUS FOR ENSURING DATA CONSISTENCY," the contents of both of which are herein incorporated by reference in their entirety.

FIELD

Embodiments of the present disclosure generally relate to the field of data storage, and more specifically, to methods and apparatuses for ensuring data consistency.

BACKGROUND

In a common storage product, a system architecture including a plurality of storage processors (SPs, also called processing nodes) attached with a shared disk is usually utilized to improve computing capability and input/output (TO) throughput of the storage product. In such a storage system architecture, configuration information for managing disks (such as, state information and a mapping table of a redundant array of independent disks) can be buffered in memories of the plurality of SPs, and the configuration information may be further stored in the shared disk.

Upon occurrence of events, such as disk failure or disk array expansion, the configuration information on a certain SP might be updated. Then, the updated configuration information can be synchronized to other SPs and finally stored on the shared disk. During the above data updating process, any SP might break down or be restarted due to software or hardware failure, resulting in data inconsistency among the memories of the plurality of SPs or among the memories and the shared disk. This might lead to severe impact on the user, such as unavailability or data unavailability.

SUMMARY

Embodiments of the present disclosure provide methods and apparatuses for ensuring data consistency.

In a first aspect of the present disclosure, there is provided a method for ensuring data consistency. The method comprises writing data into a first temporary buffer in a first processor. The method further comprises, in response to the data being written into the first temporary buffer, sending the data to a second processor to update a copy of the data in the second processor. Furthermore, the method further comprises, in response to receiving an indication that the second processor has received the data, copying the data from the first temporary buffer to a first working buffer in the first processor.

In a second aspect of the present disclosure, there is provided a method for ensuring data consistency. The method comprises, in response to receiving from a first processor data to be updated, writing the data into a second temporary buffer in a second processor. The method comprises, in response to the data being written into the second temporary buffer, sending, to the first processor, an indication that the second processor has received the data. Moreover, the method further comprises copying the data from the second temporary buffer to a second working region in the second processor.

In a third aspect of the present disclosure, there is provided an apparatus for ensuring data consistency. The apparatus comprises at least one processing unit and at least one memory, the at least one memory being coupled to the at least one processing unit and storing instructions for execution by the at least one processing unit. The instructions, when executed by the at least one processing unit, cause the apparatus to: write data into a first temporary buffer in a first processor; in response to the data being written into the first temporary buffer, send the data to a second processor to update a copy of the data in the second processor; and in response to receiving an indication that the second processor has received the data, copy the data from the first temporary buffer to a first working buffer in the first processor.

In a fourth aspect of the present disclosure, there is provided an apparatus for ensuring data consistency. The apparatus comprises at least one processing unit and at least one memory, the at least one memory being coupled to the at least one processing unit and storing instructions for execution by the at least one processing unit. The instructions, when executed by the at least one processing unit, cause the apparatus to: in response to receiving from a first processor data to be updated, write the data into a second temporary buffer in a second processor; in response to the data being written into the second temporary buffer, send, to the first processor, an indication that the second processor has received the data; and copy the data from the second temporary buffer to a second working buffer in the second processor.

In a fifth aspect of the present disclosure, there is provided a computer program product that is tangibly stored on a non-transient computer readable medium and includes machine-executable instructions. The machine-executable instructions, when being executed, cause the machine to execute any step of the method according to the first aspect of the present disclosure.

In the sixth aspect of the present disclosure, there is provided a computer program product that is tangibly stored on a non-transient computer readable medium and includes machine-executable instructions. The machine-executable instructions, when being executed, cause the machine to execute any step of the method according to the second aspect of the present disclosure.

This Summary is provided to introduce a selection of concepts in a simplified form that are further described below in the Detailed Description. This Summary is not intended to identify key features or essential features of the claimed present disclosure, nor is it intended to be used to limit the scope of the claimed present disclosure.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements.

Throughout the drawings, the same or corresponding reference symbols are used to indicate the same or corresponding parts.

DETAILED DESCRIPTION OF EMBODIMENTS

Figure 1:
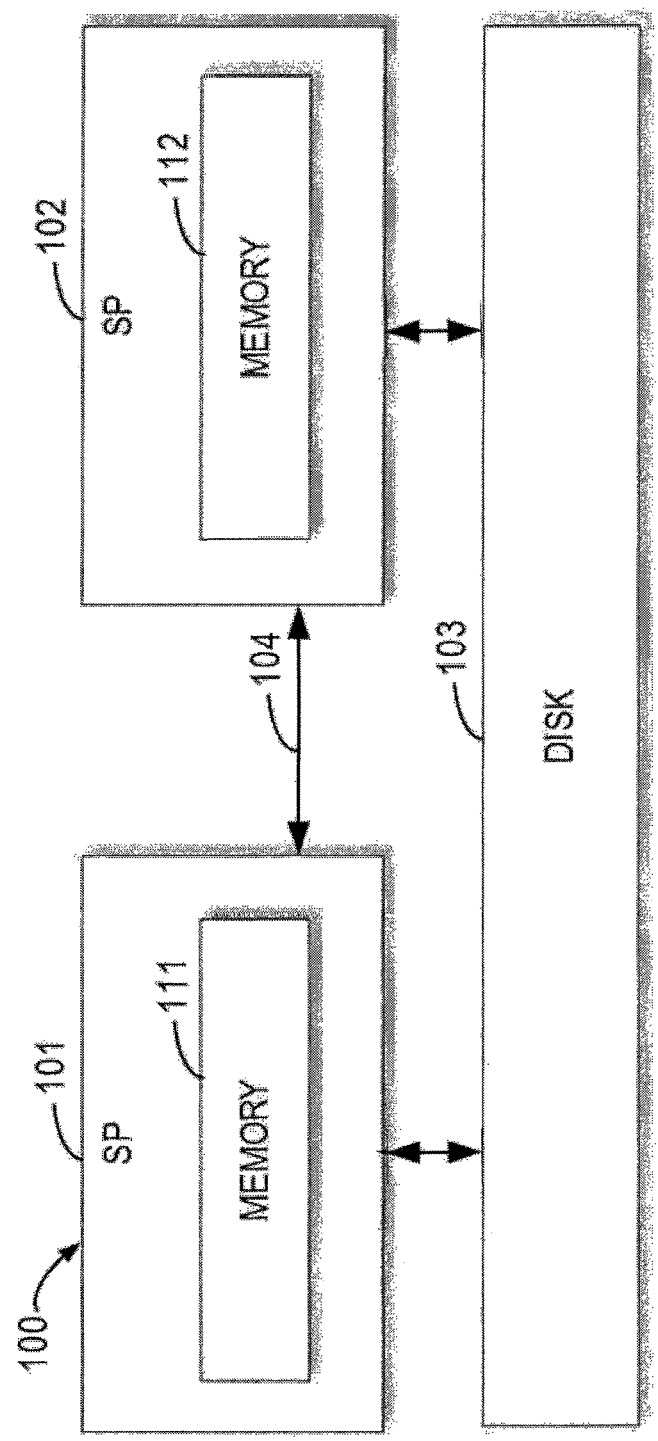
FIG. 1 illustrates an architecture diagram of an example storage system 100 with two SPs sharing a disk.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be read as "at least one other embodiment." Terms "a first", "a second" and others can denote different or identical objects. The following text may also contain other explicit or implicit definitions.

As described above, in a storage system with a plurality of SPs sharing a disk, if data on one SP is updated, the updated data can be synchronized to other SPs and finally stored on the disk. During this process, any SP may break down or be restarted due to software or hardware failure, resulting in data inconsistency among the memories of the plurality of SPs or among the memories and the disk.

To solve the above problem or one or more other potential problems at least in part, example embodiments of the present disclosure propose a scheme for ensuring data consistency. The scheme firstly updates the data to a temporary buffer in a SP and copies the data from the temporary buffer of the SP to a working buffer after the data has been updated to the temporary buffers of all the SPs in order to ensure data consistency among the memories of the plurality of SPs. Furthermore, during the process of flushing data from the memory of the SP to the disk, the scheme ensures data consistency between the memory and the disk by applying a temporary region on the disk.

FIG. 1 illustrates an architecture diagram of an example storage system 100 with two SPs sharing a disk. As shown in FIG. 1, in the storage system 100, there are two SPs sharing disk(s) 103, namely, SP 101 and SP 102. For the purpose of example, only two SPs are illustrated in FIG. 1. However, it is to be understood that the embodiments of the present disclosure may also apply to a storage system with multiple SPs. Furthermore, for the ease of depiction, a magnetic disk or a magnetic disk array will be used in the following as an example of the disk(s) 103. However, this is only for the purpose of illustration. Any storage media currently known or to be developed in the future based on other mechanisms can possibly server as the disk(s) 103.

As shown in FIG. 1, two SPs can have their respective memories, namely, memories 111 and 112. The two SPs can interact with each other via a command interface (CMI) 104 (for example, transmitting a heartbeat signal with each other). During the booting of the SPs, the two SPs can determine their respective roles through a handshake. For example, a SP that is started earlier can serve as an active SP (also called a "first SP") and the other SP serves as a passive SP (also called a "second SP").

Generally, the active SP can be used to serve an IO request of the system. When the active SP fails, the IO request can be failed over to the passive SP and served by the passive SP. For the ease of depiction, in the following text, SP 101 will be taken as an example of the active SP, namely, the first SP. SP 102 will serve as the passive SP, namely, the second SP.

The disk(s) 103 can be a single disk or a disk array including a plurality of disks (such as a redundant array of independent disks (RAID)). For example, when the disk(s) 103 is a RAID, each disk therein can be divided into a plurality of disk extents and several disk extents can be organized into RAID stripes in a RAID group. Configuration information for managing the disk(s) 103 (such as state information of the disk extents and mapping relation among the RAID stripes and the disk extents) can be buffered in the memories (such as the memories 111 and 112) of the SPs (such as SP 101 and SP 102) and stored in the disk(s) 103.

Upon occurrence of disk failure or disk extent expansion, the configuration information for managing the disk(s) 103 might need to be updated. In other words, copies of the configuration information in the memory 111, memory 112 and memory 113 should be updated respectively. During the process of updating the configuration information, SP 101 or SP 102 might be restarted or break down due to software or hardware failure, resulting in data inconsistency among SP 101, SP 102 and the disk(s) 103.

Embodiments of the present disclosure propose employing temporary buffers in the memories of the SPs and a temporary region on the shared disk to solve the above data inconsistency.

Figure 2:
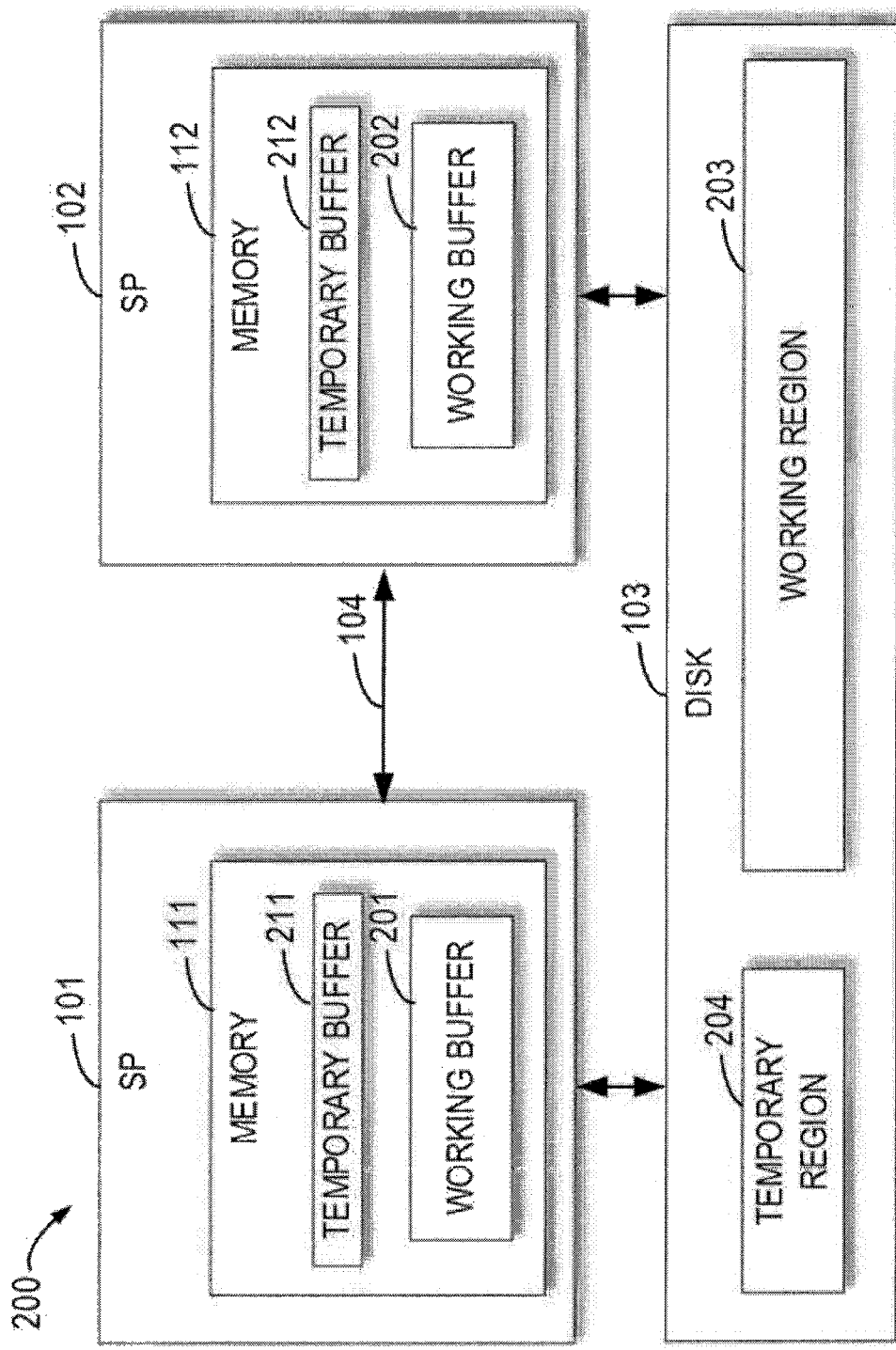
FIG. 2 illustrates an architecture diagram of a storage system 200 according to the embodiments of the present disclosure.

FIG. 2 illustrates an architecture diagram of a storage system 200 according to the embodiments of the present disclosure. Same as the storage system 100 as shown in FIG. 1, the storage system 200 may also include SP 101 and SP 102 which share the disk(s) 103 and interact with each other via CMI 104.

SP 101 and SP 102 also have their respective memories, namely, the memories 111 and 112. Different from the storage system 100 as shown in FIG. 1, the memory 111 may include a working buffer 201 and a temporary buffer 211. Similarly, the memory 112 may include a working buffer 202 and a temporary buffer 212, where the working buffers 201 and 202 are visible to the user and finally utilized to buffer the configuration information of the disk(s) 103. The temporary buffers (also called "shadow buffers") 211 and 212 are invisible to the user and employed to ensure data consistency between the memories 111 and 112. In some embodiments, the temporary buffer(s) 211 and/or 212 can be allocated in advance. In some other embodiments, the temporary buffer(s) 211 and/or 212 can be allocated temporarily for data to be updated, and released after the data is copied to the working buffer(s) 201 and/or 202.

Furthermore, the disk(s) 103 may include a working region 203 and a temporary region (also called journal region) 204, where the working region 203 may be used for storing the configuration information of the disk(s) 103 finally, and the temporary region 204 may be employed to ensure data consistency among the memories 111 and 112 and the disk(s) 103.

Figure 3:
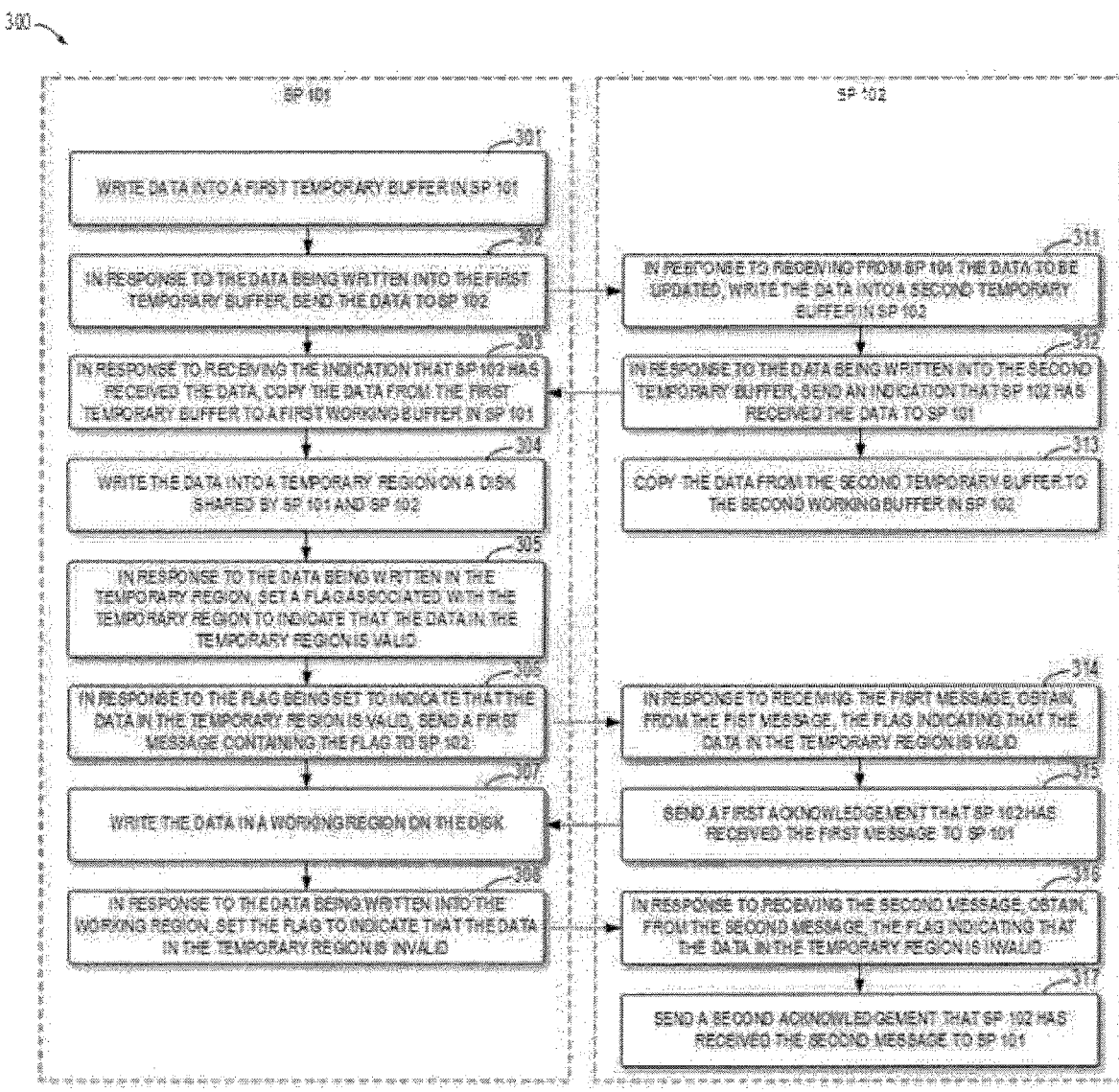
FIG. 3 illustrates a flowchart of a method 300 for ensuring data consistency according to the embodiments of the present disclosure.

FIG. 3 is a flowchart of a method 300 for ensuring data consistency according to the embodiments of the present disclosure. The acts involved in the method 300 will be described in the following text with reference to FIG. 2. For the ease of discussion, the depiction of the method 300 involves two SPs, namely, SP 101 and SP 102. In FIG. 3, for example, respective acts on the left side may be performed by SP 101 while respective acts on the right side may be performed by SP 102. In the following depiction, the working buffer 201 and the first working buffer can be used interchangeably; the working buffer 202 and the second working buffer can be used interchangeably; the temporary buffer 211 and the first temporary buffer can be used interchangeably; and the temporary buffer 212 and the second temporary buffer can be used interchangeably. It is to be understood that the method 300 may further include additional acts not shown and/or omit the shown acts. The scope of the present disclosure is not limited in this respect.

At block 301, data is written into the first temporary buffer 211 in SP 101. For example, the data can be configuration information of the disk(s) 103 to be updated, for example, the state information and mapping table of the RAID, or the like. Alternatively, the data can also be any other data with copies in SP 101, SP 102 and the disk(s) 103. At block 302, when the data is written into the temporary buffer 211, SP 101 can transmit the data to SP 102 via CMI 104 to update the copy of the data in SP 102.

Correspondingly, at block 311, in response to receiving the data to be updated from SP 101, SP 102 can write the data into the second temporary buffer 212. Then, at block 312, an indication that SP 102 has received the data is sent to SP 101.

At block 303, in response to receiving the indication, SP 101 can copy the data from the temporary buffer 211 to the working buffer 201. Additionally or alternatively, in some embodiments, the temporary buffer 211 may be temporarily allocated for the data to be updated. In this event, once the data is copied to the working buffer 201, the temporary buffer 211 can be released. At the other side, at block 313, SP 102 can also copy the data from the temporary buffer 212 to the working buffer 202. Additionally or alternatively, in some embodiments, the temporary buffer 212 may be temporarily allocated for the data to be updated. In this event, when the data is copied to the working buffer 202, the temporary buffer 212 can be released.

In other words, according to the embodiments of the present disclosure, before both SP 101 and SP 102 update data to respective temporary buffers, neither of SP 101 and SP 102 will change data in its respective working buffer. In this manner, if one or both of SP 101 and SP 102 fail or break down, data in SP 101 and SP 102 can be kept consistent.

After being synchronized to SP 102 and copied from respective temporary buffers to respective working buffers on SP 101 and SP 102, data can be stored in the disk(s) 103. As shown in FIG. 3, at block 304, SP 101 can write the data into the temporary region 204 on the disk(s) 103 shared by SP 101 and SP 102. After that, at block 305, a flag (such as, journal header) associated with the temporary region 204 can be set to indicate that data in the temporary region 204 is valid. Additionally or alternatively, at block 306, SP 101 can send a first message containing the flag to SP 102.

Correspondingly, at block 314, in response to receiving from SP 101 the first message indicating that the data is updated to the temporary region 204 on the disk(s) 103, SP 102 can obtain from the first message the flag indicating that data in the temporary region 204 is valid. Then, at block 315, a first acknowledgement that SP 102 has received the first message can be sent to SP 101.

Next, at block 307, SP 101 can write the data into the working region 203 on the disk(s) 103. Additionally or alternatively, in response to receiving the first acknowledgement, SP 101 can write the data into the working region 203. Then, at block 308, SP 101 can set the flag (such as, journal header) associated with the temporary region 204 to indicate that data in the temporary region 204 is invalid.

In some embodiments, additionally or alternatively, at block 309, SP 101 can send a second message containing the flag to SP 102. Correspondingly, at block 316, in response to receiving from SP 101 a second message indicating that the data is updated to the working region 203 on the disk(s) 103, SP 102 can obtain from the second message the flag indicating that data in the temporary region 204 is invalid. Next, at block 317, SP 102 can send to SP 101 a second acknowledgement that SP 102 has received the second message.

In other words, if the system fails before the journal header is marked as invalid, the system may check the journal header in the next starting process and replay the data in the journal region to the working region on the disk(s) 103, since the journal header indicates that there are valid data in the journal region to be flushed to the disk. In this manner, data on the disk(s) 103 and the SPs (such as SP 101 and 102) can be kept consistent.

During the execution of the method 300, the system may fail, causing SP 101 and/or SP 102 to be unable to work. Embodiments of the present disclosure can ensure data consistency among SP 101, SP 102 and the disk(s) 103 under various failure conditions.

In some embodiments, at block 301 or 302, if SP 101 fails, the data updating request can be failed back to the requestor. However, if SP 102 fails, SP 101 can determine that SP 102 has failured by detecting that the heartbeat signal transmitted via CMI 104 stops and continue the data updating process without performing SP synchronization.

In some embodiments, at blocks 311-313 or 303-305, if SP 101 fails, the updating request can be failed over to SP 102. Since SP 102 has obtained the data to be updated, it can continue the data updating process without performing SP synchronization. At blocks 311-313 or 303-305, if SP 102 fails, SP 101 can continue the data updating process without performing SP synchronization.

In some embodiments, at blocks 314-315 or 307-309, if SP 101 fails, the updating request can be failed over to SP 102, and SP 102 can serve as the active SP and continue to perform the data updating process from block 307 without performing SP synchronization, since SP 102 has obtained the journal header and learned that the data in the journal region 204 is valid. At blocks 314-315 or 307-308, if SP 102 fails, SP 101 can continue the data updating process without performing SP synchronization.

In some embodiments, at block 316 or 317, if SP 101 fails, the updating request can be failed over to SP 102 which can serve as the active SP and continue to perform the data updating process from block 316 without performing SP synchronization. SP 102 can just clear respective data structures and then report to the requester that the updating has been completed. At block 316 or 317, if SP 102 fails, SP 101 can continue the data updating process without performing SP synchronization.

In some embodiments, at or before block 305, if both SP 101 and SP 102 fail at the same time, though data in the memories on the SPs have been updated partially or completely, data on the disk(s) 103 has not been updated yet. In this event, SP 101 and SP 102 can be restarted to reload data from the disk(s) 103. Therefore, after the restarting, data on SP 101, SP 102 and the disk(s) 103 are recovered back to the data before the updating. As the journal header is invalid, the process associated with the journal region will not occur during the restarting period.

In some embodiments, after block 305 and before block 308 (including at block 308) if both SP 101 and SP 102 fail at the same time, SP 101 and SP 102 can be restarted. During the restarting period, in response to detecting that the journal header is valid, data in the journal region can be replayed or flushed to the working region 203 on the disk(s) 103. After replaying the journal, the data on the disk(s) 103 will be the updated. By reloading the data on the disk(s) 103 to SP 101 and SP 102, the data on SP 102, SP 102 and the disk(s) 103 will be kept consistent (that is, the updated data).

In some embodiments, after block 308, if both SP 101 and SP 102 fail, they can be restarted. During the restarting period, in response to detecting that the journal header is invalid, it can be learned that data on the disk(s) 103 have been updated. By reloading the data on the disk(s) 103 to SP 101 and 102, the data on SP 102, SP 102 and the disk(s) 103 will be kept consistent (that is, the updated data).

As stated above, the embodiments of the present disclosure can ensure data consistency among the memories of the plurality of SPs by firstly updating data to the temporary buffers in SPs and copying data from the temporary buffers of the SPs to the working buffer once the data is updated to the temporary buffers of all the SPs. Furthermore, during the period when the data is flushed from the memories of the SPs to the disk, the embodiments of the present disclosure can ensure data consistency among the memories and the disk by employing the journal region on the disk.

Figure 4:
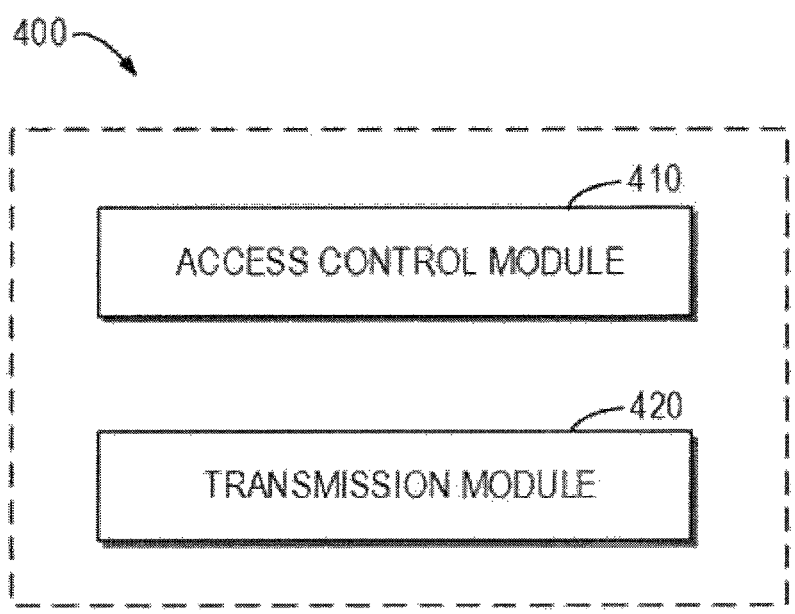
FIG. 4 illustrates a block diagram of an apparatus 400 for ensuring data consistency according to the embodiments of the present disclosure.

FIG. 4 is a block diagram of an apparatus 400 for ensuring data consistency according to the embodiments of the present disclosure. For example, SP 101 shown in FIG. 2 can be implemented by the apparatus 400. As shown in FIG. 4, the apparatus 400 includes an access control module 410 which may be configured to write data into the temporary buffer 211 in SP 101. The apparatus 400 further includes a transmission module 420 which may be configured to send the data to SP 102 to update a copy of the data in SP 102 responsive to the data being written into the temporary buffer 211. Furthermore, the access control module 410 may be further configured to copy the data from the temporary buffer 211 to the working buffer 201 in SP 101 in response to receiving an indication that SP 102 has received the data.

Figure 5:
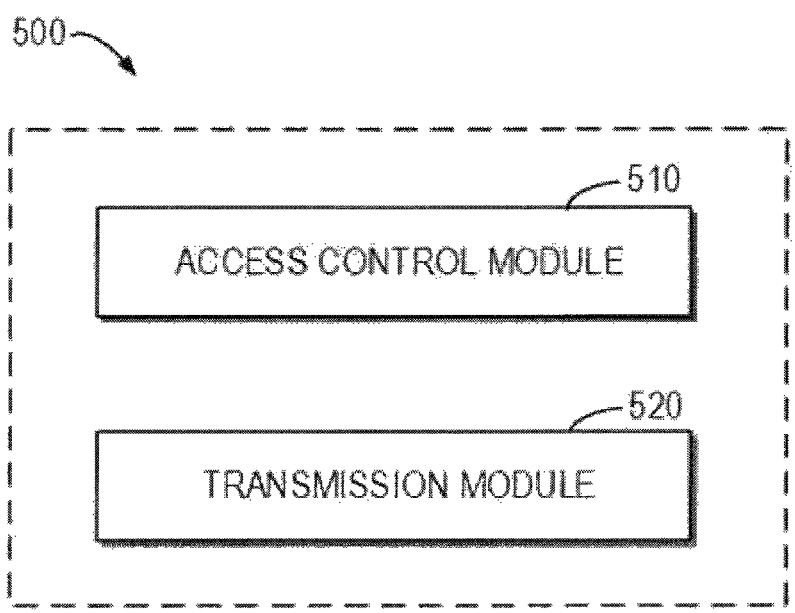
FIG. 5 illustrates a block diagram of an apparatus 500 for ensuring data consistency according to the embodiments of the present disclosure.

FIG. 5 is a block diagram of an apparatus 500 for ensuring data consistency according to the embodiments of the present disclosure. For example, SP 102 shown in FIG. 2 can be implemented by the apparatus 500. As shown in FIG. 5, the apparatus 500 includes an access control module 510 which may be configured to write the data to be updated into the temporary buffer 212 in SP 102 in response to receiving the data from the SP 101. The apparatus 500 further includes a transmission module 520 which may be configured to, in response to the data being written into the temporary buffer 212, send an indication to SP 101 that SP 102 has received the data. Furthermore, the access control module 510 may be further configured to copy the data from the temporary buffer 212 to the working buffer 202 in SP 102.

For the sake of clarity, some optional modules of the apparatus 400 and/or 500 are not shown in FIG. 4 and/or FIG. 5. However, it is to be understood that various features as described with reference to FIGS. 2-3 are likewise applicable to the apparatus 400 and/or 500. Besides, respective modules of the apparatus 400 and/or 500 may be hardware modules or software modules. For example, in some embodiments, the apparatus 400 and/or 500 may be partially or completely implemented by software and/or firmware, e.g., implemented as a computer program product embodied on a computer readable medium. Alternatively or additionally, the apparatus 400 and/or 500 may be partially or completely implemented based on hardware, for example, implemented as an integrated circuit (IC) chip or an application specific integrated circuit (ASIC), a system on chip (SOC), a field programmable gate array (FPGA) and so on. The scope of the present disclosure is not limited in this aspect.

Figure 6:
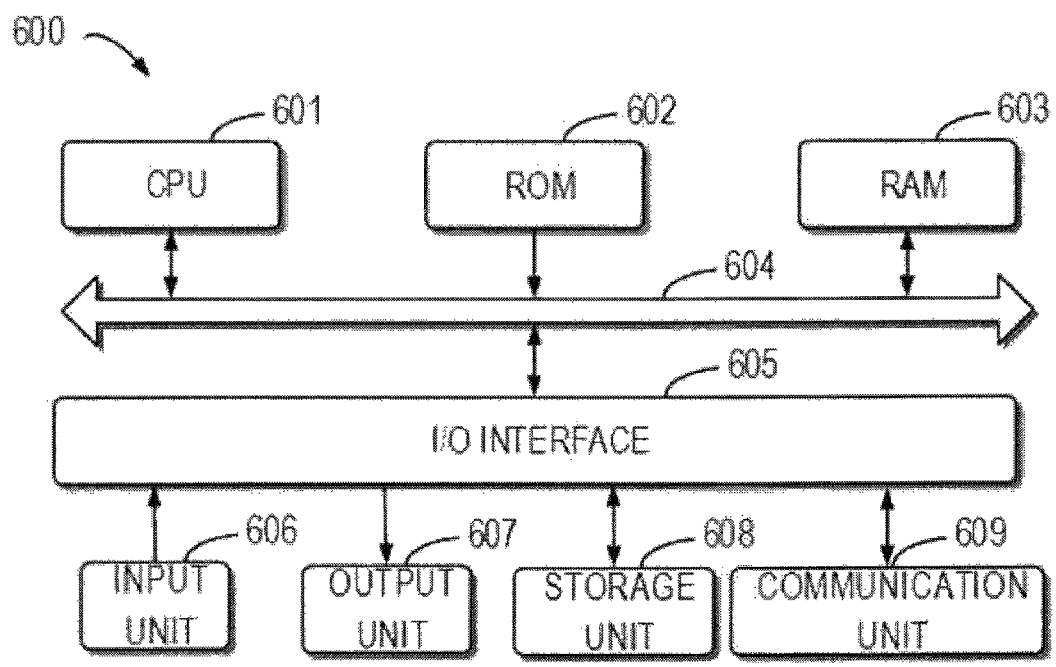
FIG. 6 illustrates a block diagram of a computer system 600 adapted to implement the example embodiments of the present disclosure.

FIG. 6 is a schematic block diagram of an example apparatus 600 that can be used to implement the embodiments of the present disclosure. For example, SP 101 and/or SP 102 as shown in FIG. 2 can be implemented by the apparatus 600. As shown in FIG. 6, the apparatus 600 includes a central processing unit (CPU) 601 which may perform various appropriate actions and processing based on computer program instructions stored in the read only memory (ROM) 602 or computer program instructions uploaded from storage unit 608 to the random access memory (RAM) 603. In the RAM 603, there further stores various programs and data needed by operation of the apparatus 600. The CPU 601, ROM 602 and RAM 603 are connected one another via a bus 604. The input/output (I/O) interface 605 is also connected to the bus 604.

The following components in the apparatus 600 are connected to the I/O interface 605: including: an input unit 606, such as a keyboard, a mouse, and the like; an output unit 607, such as display of various types and loudspeakers; a storage unit 608, such as magnetic disk and optical disk; a communication unit 609, such as network card, modem, wireless communication transceiver. The communication unit 609 allows the apparatus 600 to exchange data/information with other devices via computer networks, such as Internet and/or telecommunication networks.

The processes and processing described above, the method 300 for instance, can be executed by the processing unit 601. For example, in some implementations, the method 300 can be implemented as a computer software program which is corporeally contained in a machine readable medium, such as the storage unit 608. In some implementations, the computer program can be partially or wholly loaded and/or mounted on the apparatus 600 by the ROM 602 and/or the communication unit 609. When the computer program is uploaded to the RAM 603 and executed by the CPU 601, one or more steps of the method 300 described above can be executed.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local region network, a wide region network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. An apparatus for ensuring data consistency, comprising:

a first processing unit (processor);
at least one memory coupled to the first processor and storing instructions for execution by the first processor, the instructions, when executed by the first processor, causing the apparatus to:
in response to receiving, from a second processor, data to be updated, write the data into a temporary buffer in the first processor;
in response to the data being written into the temporary buffer, send, to the second processor, an indication that the first processor has received the data; and
copy the data from the temporary buffer to a working buffer in the first processor.

2. The apparatus of claim 1, wherein the instructions, when executed by the first processor, further cause the apparatus to, in response to the data being copied to the working buffer, release the temporary buffer.

3. The apparatus of claim 1, wherein the instructions, when executed by the first processor, further cause the apparatus to:
in response to receiving from the second processor a message indicating that the data has been updated to a temporary region on a disk shared by the first and second processors, obtain, from the message, a flag indicating that the data in the temporary region is valid; and
send, to the second processor, an acknowledgement that the first processor has received the message.

4. The apparatus of claim 3, wherein the instructions, when executed by the first processor, further cause the apparatus to:
in response to receiving from the second processor another message indicating that the data has been updated to a working region on the disk, obtain, from the other message, the flag indicating that the data in the temporary region is invalid; and
send, to the second processor, another acknowledgement that the first processor has received the other message.

5. The apparatus of claim 3 wherein the data is configuration information for the shared disk, the configuration information including state information and a mapping table.

6. The apparatus of claim 1, wherein the instructions, when executed by the first processor, further cause the apparatus to:
in response to determining that the second processor is unresponsive:
write the data into a temporary region on the disk shared by the first and second processors;
in response to the data being written into the temporary region, set a flag associated with the temporary region to indicate that the data in the temporary region is valid;
write the data into a working region on the disk; and
in response to the data being written into the working region, set the flag to indicate that the data in the temporary region is invalid.

7. A storage system for ensuring data consistency, comprising:
a first processing unit (processor) coupled to memory of the first processor;
a second processor coupled to memory of the second processor; and
persistent data storage shared between the first and second processors;
wherein the first processor is configured to:
write data into a temporary buffer in the memory of the first processor;
in response to the data being written into the temporary buffer, send the data to the second processor to update a copy of the data in the memory of the second processor; and
in response to receiving an indication that the second processor has received the data, copy the data from the temporary buffer to a working buffer in the memory of the first processor.

8. The storage system of claim 7, wherein the first processor is further configured to, in response to the data being copied to the working buffer, release the temporary buffer.

9. The storage system of claim 7, wherein the first processor is further configured to:
in response to determining that the second processor is unresponsive, write the data into a temporary region on the shared persistent data storage;
in response to the data being written into the temporary region, set a flag associated with the temporary region to indicate that the data in the temporary region is valid;
after setting the flag associated with the temporary region to indicate that the data in the temporary region is valid, write the data into a working region on the shared persistent data storage; and
in response to the data being written into the working region, set the flag to indicate that the data in the temporary region is invalid.

10. The storage system of claim 7, wherein the second processor is configured to:
in response to receiving, from the first processor, the data to be updated, write the data into another temporary buffer in the memory of the second processor;
in response to the data being written into the other temporary buffer, send, to the first processor, the indication that the second processor has received the data; and
copy the data from the other temporary buffer to another working buffer in the memory of the second processor.

11. The storage system of claim 10, wherein:
the first processor is further configured to, in response to the data being copied to the working buffer, release the temporary buffer; and
the second processor is further configured to, in response to the data being copied to the other working buffer, release the other temporary buffer.

12. The storage system of claim 10, wherein:
the first processor is further configured to:
in response to the data being copied to the working buffer, write the data into a temporary region on the shared persistent data storage;
in response to the data being written into the temporary region, set a flag associated with the temporary region to indicate that the data in the temporary region is valid; and
in response to setting the flag associated with the temporary region to indicate that the data in the temporary region is valid, sending to the second processor a message indicating that the data has been updated to the temporary region, the message including the flag indicating that the data in the temporary region is valid; and
the second processor is further configured to:
in response to receiving from the first processor the message indicating that the data has been updated to the temporary region, obtain, from the message, the flag indicating that the data in the temporary region is valid; and send, to the first processor, an acknowledgement that the second processor has received the message.

13. The storage system of claim 12, wherein:

the first processor is further configured to:
in response to receiving the acknowledgement that the second processor has received the message, write the data into a working region on the shared persistent data storage;
in response to the data being written into the working region, set the flag to indicate that the data in the temporary region is invalid; and
in response to setting the flag to indicate that the data in the temporary region is invalid, sending to the second processor another message indicating that the data has been updated to the working region, the other message including the flag indicating that the data in the temporary region is invalid; and the second processor is further configured to:
in response to receiving from the first processor the other message indicating that the data has been updated to the working region, obtain, from the other message, the flag indicating that the data in the temporary region is invalid; and
send, to the first processor, another acknowledgement that the second processor has received the other message.

14. The storage system of claim 7 wherein the data is configuration information for the shared persistent data storage, the configuration information including state information and a mapping table.

15. A computer program product for ensuring data consistency, comprising a non-transitory computer-readable storage medium storing instructions, which, when executed by a first processing unit (processor) of a storage system, cause the storage system to:

write data into a temporary buffer in memory of the first processor;
in response to the data being written into the temporary buffer, send the data to a second processor of the storage system to update a copy of the data in memory of the second processor; and
in response to receiving an indication that the second processor has received the data, copy the data from the temporary buffer to a working buffer in the memory of the first processor.

16. The computer program product of claim 15, wherein the instructions, when executed by the first processor, further cause the storage system to:

in response to the first processor determining that the second processor is unresponsive, write the data into a temporary region on the shared persistent data storage;
in response to the data being written into the temporary region, set a flag associated with the temporary region to indicate that the data in the temporary region is valid;
after setting the flag associated with the temporary region to indicate that the data in the temporary region is valid, write the data into a working region on the shared persistent data storage; and
in response to the data being written into the working region, set the flag to indicate that the data in the temporary region is invalid.

17. The computer program product of claim 15, wherein the instructions, when executed by the second processor, further cause the storage system to:

in response to the second processor receiving, from the first processor, the data to be updated, write the data into another temporary buffer in the memory of the second processor;
in response to the data being written into the other temporary buffer, send, from the second processor to the first processor, the indication that the second processor has received the data; and
copy the data from the other temporary buffer to another working buffer in the memory of the second processor.

18. The computer program product of claim 17, wherein:

the instructions, when executed by the first processor, further cause the storage system to:
in response to the data being copied to the working buffer, write the data into a temporary region on the shared persistent data storage;
in response to the data being written into the temporary region, set a flag associated with the temporary region to indicate that the data in the temporary region is valid; and
in response to setting the flag associated with the temporary region to indicate that the data in the temporary region is valid, sending from the first processor to the second processor a message indicating that the data has been updated to the temporary region, the message including the flag indicating that the data in the temporary region is valid; and the instructions, when executed by the second processor, further cause the storage system to:
in response to the second processor receiving from the first processor the message indicating that the data has been updated to the temporary region, obtain, from the message, the flag indicating that the data in the temporary region is valid; and
send, from the first processor to the first processor, an acknowledgement that the second processor has received the message.

19. The computer program product of claim 18, wherein:

the instructions, when executed by the first processor, further cause the storage system to:
in response to the first processor receiving the acknowledgement that the second processor has received the message, write the data into a working region on the shared persistent data storage;
in response to the data being written into the working region, set the flag to indicate that the data in the temporary region is invalid; and
in response to setting the flag to indicate that the data in the temporary region is invalid, sending from the first processor to the second processor another message indicating that the data has been updated to the working region, the other message including the flag indicating that the data in the temporary region is invalid; and the instructions, when executed by the second processor, further cause the storage system to:
in response to the second processor receiving from the first processor the other message indicating that the data has been updated to the working region, obtain, from the other message, the flag indicating that the data in the temporary region is invalid; and
send, from the second processor to the first processor, another acknowledgement that the second processor has received the other message.

20. The computer program product of claim 15 wherein the data is configuration information for the shared persistent data storage, the configuration information including state information and a mapping table.

* * * * *